`US012362889B2`

(12) United States Patent
Wu et al.

(10) Patent No.: US 12,362,889 B2
(45) Date of Patent: Jul. 15, 2025

(54) METHOD FOR COMPRESSING WIRELESS CHANNEL STATE INFORMATION FEEDBACK

(71) Applicant: ZTE Corporation, Guangdong (CN)

(72) Inventors: Hao Wu, Guangdong (CN); Yong Li, Guangdong (CN); Guozeng Zheng, Guangdong (CN); Zhaohua Lu, Guangdong (CN); Yu Ngok Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 469 days.

(21) Appl. No.: 17/825,318

(22) Filed: May 26, 2022

(65) Prior Publication Data

US 2022/0286261 A1 Sep. 8, 2022

Related U.S. Application Data

(63) Continuation of application No. PCT/CN2019/122096, filed on Nov. 29, 2019.

(51) Int. Cl.
*H04L 5/00* (2006.01)
*H04W 24/10* (2009.01)

(52) U.S. Cl.
CPC ........... *H04L 5/0057* (2013.01); *H04W 24/10* (2013.01)

(58) Field of Classification Search
CPC ... H04L 5/0057; H04L 5/0092; H04L 5/0007; H04L 5/0082; H04L 1/0026; H04L 5/005; H04L 1/06; H04W 24/10; H04W 72/232; H04B 7/0632; H04B 7/0663; H04B 7/0413; H04B 7/0626; H04B 7/0473; H04B 7/0478

See application file for complete search history.

(56) References Cited

U.S. PATENT DOCUMENTS

| | | | | |
|---|---|---|---|---|
| 11,901,996 B2* | 2/2024 | Ramireddy | .......... | H04B 7/0626 |
| 11,909,466 B2* | 2/2024 | Wu | ....... | H04B 7/0632 |
| 12,009,893 B2* | 6/2024 | Li | ........ | H04B 7/0641 |

(Continued)

FOREIGN PATENT DOCUMENTS

| | | |
|---|---|---|
| CN | 103312434 A | 9/2013 |
| CN | 108737032 A | 11/2018 |

(Continued)

OTHER PUBLICATIONS

CATT; "Discussions on Type II CSI enhancement"; 3GPP TSG RAN WG1 Meeting #96, R1-1902018; server date Feb. 16, 2019, downloaded by EPO on Feb. 17, 2019; Mar. 1, 2019; 16 pages.

(Continued)

*Primary Examiner* — Brian T O'Connor
(74) *Attorney, Agent, or Firm* — Crowell & Moring LLP

(57) ABSTRACT

This disclosure relates to channel state information reference signal configuration, precoding, and transmission, and channel state information feedback configuration, compression, and transmission in multiple-input and multiple-output (NEMO) wireless communication systems. The various embodiments provide channel state information reference signal and feedback schemes which facilitate a decrease of the amount of information that need to be transmitted and reduce communication resource overhead for channel state information configuration and feedback.

14 Claims, 10 Drawing Sheets

(56) References Cited

U.S. PATENT DOCUMENTS

| | | | |
|---|---|---|---|
| 12,047,989 B2* | 7/2024 | Wei | H04W 72/542 |
| 12,068,827 B2* | 8/2024 | Huang | H04B 7/0456 |
| 12,081,299 B2* | 9/2024 | Liu | H04B 7/0478 |
| 12,199,719 B2* | 1/2025 | Li | H04B 7/0478 |
| 2016/0142189 A1 | 5/2016 | Shin et al. | |
| 2018/0212656 A1* | 7/2018 | Zhao | H04L 1/06 |
| 2019/0334587 A1* | 10/2019 | Rahman | H04B 7/0626 |
| 2020/0374175 A1* | 11/2020 | Ren | H04L 27/26524 |
| 2021/0376887 A1* | 12/2021 | Wu | H04B 7/0645 |
| 2022/0286261 A1* | 9/2022 | Wu | H04B 7/0632 |
| 2024/0129011 A1* | 4/2024 | Ramireddy | H04B 7/0663 |
| 2024/0259054 A1* | 8/2024 | Wu | H04B 7/0632 |
| 2024/0291540 A1* | 8/2024 | Li | H04B 7/0641 |
| 2025/0056593 A1* | 2/2025 | Wei | H04B 7/0695 |

FOREIGN PATENT DOCUMENTS

| | | | |
|---|---|---|---|
| CN | 109845311 A | 6/2019 | |
| WO | WO 2015/093910 A1 | 6/2015 | |
| WO | WO 2017/194826 A1 | 11/2017 | |
| WO | WO 2019/157757 A1 | 8/2019 | |

OTHER PUBLICATIONS

Intel Corporation; "Discussion on Type II CSI compression"; 3GPP TSG RAN WG1 #95; server date Nov. 11, 2018, downloaded by EPO on Dec. 14, 2018; Nov. 16, 2018; 10 pages.

Extended European Search Report dated Oct. 28, 2022 for European Application No. 19954319.0 (9 pages).

Samsung et al.; "Remaining issues on NR CSI-RS"; 3Gpp TSG RAN WG1 Meeting #89 R1-1707981; May 4, 2017; 15 pages.

International Search Report mailed Aug. 27, 2020 for International Application No. PCT/CN2019/122096.

Written Opinion mailed Aug. 27, 2020 for International Application No. PCT/CN2019/122096.

Search Report and Written Opinion, Mar. 24, 2024, pp. 1-7, issued in Singapore Patent Application No. 11202205062Q, Intellectual Property Office of Singapore.

Korean Office Action corresponding to Korean Patent Application No. 10-2022-7017668 dated Sep. 24, 2024, with English Summary translation (7 pages).

* cited by examiner

METHOD FOR COMPRESSING WIRELESS CHANNEL STATE INFORMATION FEEDBACK

CROSS REFERENCE

This application is a continuation of and claims priority to International Patent Application No. PCT/CN2019/122096, filed Nov. 29, 2019, which is herein incorporated by reference in its entirety.

TECHNICAL FIELD

This disclosure is directed to channel reference signal transmission and channel state information feedback in a wireless communication system.

BACKGROUND

Reliability in wireless communications systems employing multiple-input and multiple-output (MIMO) technologies relies critically on signal processing such as preceding and beam forming prior to signal transmission via wireless channels. Parameters for such signal processing may be derived from measurement of reference signals transmitted via the wireless channels and fed back between wireless devices. Efficient transmission of the reference signal and feedback information helps reduce an overall communication resource consumption of the wireless communication system.

SUMMARY

This disclosure relates to channel state information reference signal configuration, precoding, and transmission, and channel state information feedback configuration, compression, and transmission in MIMO wireless communication systems. The various embodiments provide channel state information reference signal and feedback schemes which facilitate a decrease of the amount of information that need to be transmitted and reduce communication resource overhead for channel state information configuration and feedback.

In one implementation, a method for handling wireless channel state information (CSI) report is disclosed. The method may be performed by a wireless terminal device. The method may include receiving a CSI reporting time configuration from a wireless access network node; receiving a series of a plurality of CSI reference signals (CSI-RSs) from the wireless access network node within a time window of a time length determined according to the CSI reporting time configuration; generating a CSI feedback based on the plurality of CSI-RSs; and reporting, by the wireless terminal device, the CSI feedback to the wireless access network node.

In another implementation, a method for reporting wireless CSI is disclosed. The method may be performed by a wireless terminal device. The method may include receiving CSI reference signals (CSI-RSs) transmitted from a wireless access network node; generating, based on measuring the CSI-RSs, one or more indicators associated with one or more nonzero elements in a CSI feedback information in a vector space determined by a set of first basis vectors, a set of second basis vectors, a set of third basis vectors; and transmitting information pertaining to the one or more nonzero elements in the CSI feedback information and to the one or more indicators to the wireless access network node.

In another implementation, a method for handling wireless CSI report is disclosed. The method may be performed by a wireless access network node. The method may include Transmitting a CSI reporting time configuration from to wireless terminal device; transmitting a series of a plurality of CSI reference signals (CSI-RSs) to the wireless terminal device within a time window of a time length determined according to the CSI reporting time configuration; and receiving a CSI feedback generated by the wireless terminal device based on the plurality of CSI-RSs.

In another implementation, a method for reporting wireless CSI is discloses. The method may be performed by a wireless access network node. The method may include transmitting CSI reference signals (CSI-RSs) to a wireless terminal device; and receiving a CSI report based on measurement of the CSI-RSs by the wireless terminal device. The CIS report may include information pertaining to one or more indicators associated with one or more nonzero elements in a CSI feedback information generated by the wireless terminal device in a vector space determined by a set of first basis vectors, a set of second basis vectors, and a set of third basis vectors; and information pertaining the one or more nonzero elements.

In some other implementations, a communication device is disclosed. The communication device main include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above embodiments and other aspects and alternatives of their implementations are explained in greater detail in the drawings, the descriptions, and the claims below.

DETAILED DESCRIPTION

Figure 1:
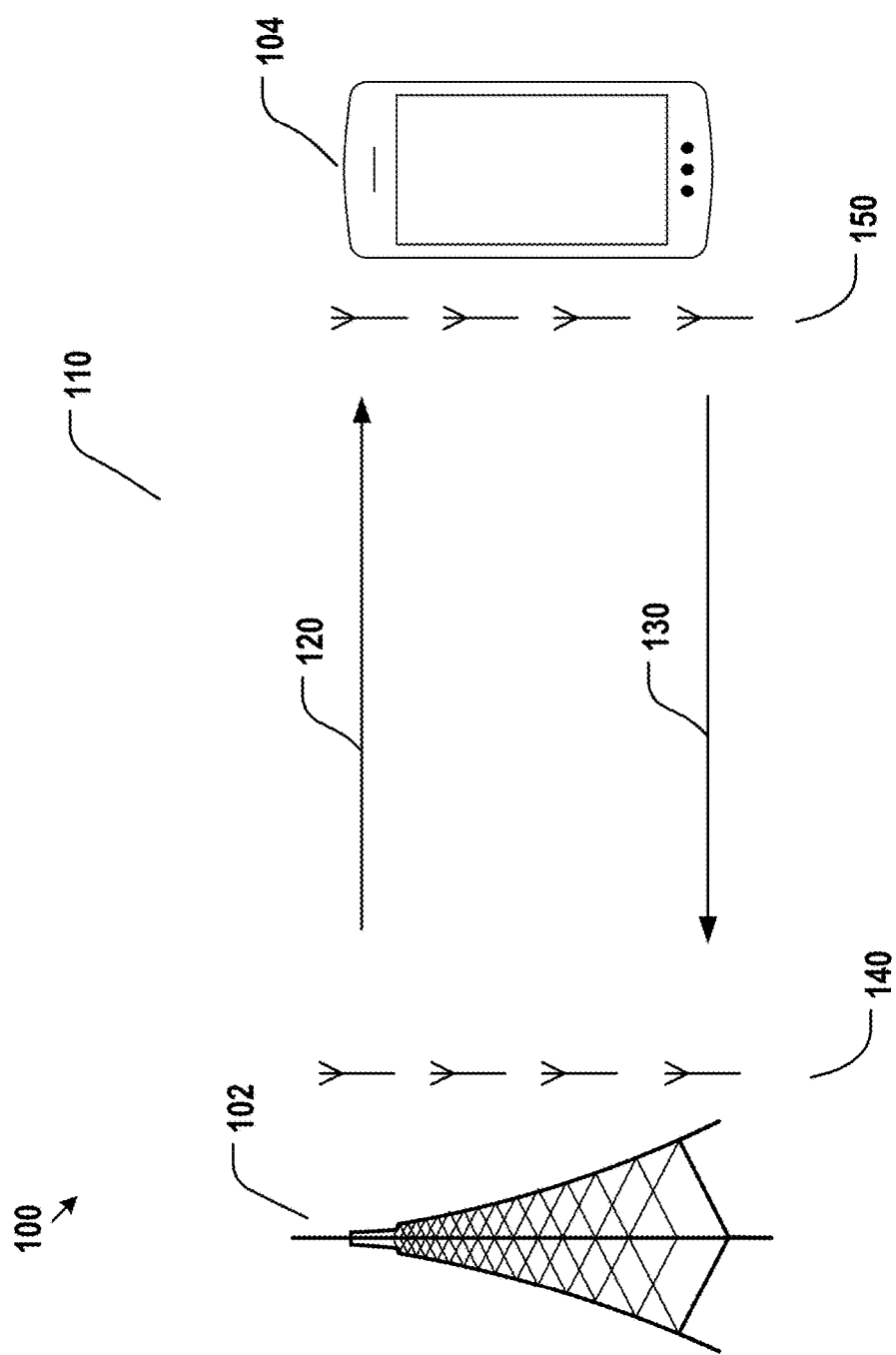
FIG. 1 illustrates a wireless access network including a wireless access network node and a user equipment.

As shown in FIG. 1, a wireless access network 100 may include a wireless user equipment (UE) or wireless terminal device 104 and a wireless access network node or base station 102. The wireless access network node 102 may be backhauled to a core network (not shown). The UE 104 may communicate with the wireless access network node 102 via over-the-air channels 110. The wireless access network node 102 and the core network may be configured to transmit and route voice, data, and other information between the UE 104 and other UEs, data networks, or other wireless core networks terminated at the edges of the core network. The UE 104 may include but is not limited to a mobile phone, a tablet, a laptop computer, a smart home electronic device or appliance, a remote sensor device, and the like. The over-the-air channels 110 may include downlink channels 130 for communicating data and control signals from the wireless access network node 102 to the UE 104 and uplink channels 130 for communicating data and control signals from the UE 104 to the wireless access network node 102. The over-the-air channels 110 may be implemented by allocating radio resources in frequency and time over one or more transmitting antennas and receiving antennas 140 and 150. The radio resources may be organized as radio resource blocks (RBs) each containing a plurality of radio resource elements (REs).

The multiple transmission and receiving antenna system described in FIG. 1 may be referred to as a MIMO wireless access system. The MIMO system may be used to achieve data transmission diversity for increased transmission accuracy, or data multiplexing for increase transmission throughput, or a combination thereof. The MIMO system may further be used to achieve multi-stream or multi-layer RF beam forming based on diversity for enhancing wireless signal at, for example, particular wireless UEs in a multi-UE environment. Data may be precoded and mapped to radio resources and the multiple transmission antennas for transmission via the over-the air channels characterized by, e.g., a channel transmission matrix. The precoding, for example, may be achieved via data transformation using a linear combination of sets of basis vectors selected from one or more predetermined codebooks.

To increase the efficiency and reliability of signal transmission, the set of basis vectors for precoding of data channels for a transmitting end may be selected to match the over-the-air channel transformation characteristics. As such, the transmitting end may need to acquire channel state information (CSI) in order to determine the selection of the precoding basis vectors and their linear combination coefficients. The CSI may be obtained as a feedback from a receiving end of the wireless channel. In particular, the transmitting end may first transmits a reference signal, referred to as a CSI reference signal or CSI-RS, to the receiving end via the over-the air channels. The receiving end may receive and measure the transmitted reference signal and generate a set of feedback parameters and include the set of feedback parameters in a CSI feedback report (or CSI report for simplicity) transmitted back to the transmitting end. The set of feedback parameters, for example, may include a recommended selection of the precoding basis codebook vectors and their coefficients. The basis codebook vector coefficients, for example, may include amplitudes and phases of the coefficients. These parameters in the CSI report may be further quantized prior to being fed back in order to reduce the amount of information needs to be transmitted (e.g., only quantization level indexes into a predetermined quantization table may need to be transmitted).

The transmission end can be either the wireless access network node 102 or the UE 104 of FIG. 1. Correspondingly, the receiving end may be either the UE 104 or the wireless access network node 102. For clarity purposes, the description below refers to the wireless access network node 102 as the transmitting end and the UE 104 as the receiving end. As such, the term "transmitting end" and "wireless access network node"/"base station" may be used interchangeably. Likewise, the term "receiving end" and "UE"/"wireless terminal device"/"terminal" may be used interchangeably. However, the underlying principles described below similarly apply to scenarios where the UE 104 is transmitting end and the wireless access network 102 is the receiving end.

As such, the design of the CSI-RS, the configuration of the CSI-RS, the transmission of the CSI-RS, the measurement accuracy of the transmitted CSI-RS, and the feedback generation and transmission of the CSI are all critical components of a high-performance MIMO system. For example, the transmission of the CSI-RS signal by the transmitting end and the feedback of the CSI report by the receiving end consume radio resources. As such, improving the design of the CSI-RS and CSI report, and increasing the efficiency of the transmission of the CSI-RS signal and the CSI feedback report, help reduce downlink and uplink radio resource consumption and lower the overhead of the wireless communication system.

As described in the various implementations in detail below, the efficiency of the MIMO system may be enhanced in several manners with respect to the CSI-RS design and transmission, and the CSI feedback process. In one exemplary implementation manner, a selected set of spatial domain basis vectors (from a predetermined spatial domain codebook) and their coefficients at various frequencies or subcarriers in, e.g., orthogonal frequency division multiplexing (OFDM), may be collectively transformed into a set of frequency domain basis vectors (among a predetermined frequency domain codebook) and corresponding frequency domain coefficients to reduce the number of basis vectors and coefficients that may need to be transmitted in a CSI feedback report, by taking advantage of the frequency domain correlation.

In another exemplary implementation manner, the transmission side, e.g., the wireless access network node may obtain a certain candidate codebook basis vectors for downlink transmission in some manner for configuration CSI of the receiving end. For example, the wireless access node may obtain a set of candidate codebook basis vectors by additionally measuring the uplink channel in a certain manner based on, for example, channel reciprocity. As such, the transmitting end can use this candidate codebook basis vector information to improve the performance of the CSI feedback from the receiving end (e.g., the wireless terminal device), or to reduce the CSI feedback overhead and reference signal overhead. More specifically, the CSI feedback mechanism may be enhanced to provide improved measurement of the CSI-RS and more accurate determination of the CSI parameters by the receiving end by being give candidate precoding parameters containing the candidate codebook basis vectors selected by the transmitting end. Identification information of such candidate basis vectors may either be carried in the CSI-RS signal when transmitting the CSI-RS signal or be transmitted via some other channels. In such a manner, the receiving end may obtain candidate basis vector selection information from the received CSI-RS. Such information may facilitate an improved determination of the CSI feedback parameters by the receiving end. For example, by determining the selection information for the candidate basis vectors via the information carried in the CSI-RS signal or transmitted by the transmitting end via some other channels, the receiving end may focus on derivation and determination of more accurate linear combination coefficients for these candidate basis vectors. The determination of the candidate basis vectors by the transmitting end may be based on other reference signal received by the transmitting end from the receiving end, e.g., a sounding reference signal (SRS) transmitted from the receiving end to the transmitting end, under the principle or assumption of reciprocity of uplink and downlink channel characteristics.

In yet another implementation manner, the UE may be mobile and moving with appreciable speed (e.g., the UE may be in a moving car or train). In such situations, the receiving end may need to frequently provide CSI feedback for the transmitting end to keep track of changes in channel characteristics and to adjust the precoding parameters in time accordingly, leading to large radio resource consumption over time. In some implementations, the receiving end, rather than sending a CSI feedback report each time a CSI-RS is received, may compress multiple CSI feedback information in time domain. As such, time correlation between CSI feedback information of multiple CSI-RSs may be exploited to enable a transmission of a reduced number of CSI feedback reports for a plurality of CSI-RSs, thereby reducing the accumulative radio resource consumption and overhead in transmitting CSI report over time. The transmitting end, after receiving a compressed CSI feedback, may anticipate or predicting precoding parameters for future times (due to the motion of the receiving end) using, e.g., extrapolation.

In yet another implementation manner, the information that is included in the CSI feedback may be further compressed based on a sparsity of the information. For example, only nonzero elements may need to be fed back. In particular, for the precoding coefficients in a vector space formed by various sets of basis vectors selected from corresponding codebooks, only the nonzero elements and their positional information in the vector space may be transmitted. Such positional information, for example, may be coded and represented by various indexes of various dimensions.

Precoding Based on Spatial Domain Codebook Basis Vectors and Frequency Domain Codebook Basis Vectors For a high-precision CSI feedback implementation, the terminal feeds back precoding information by measuring CSI-RS. The precoding information for each transmission stream or transmission layer Wray be organized in the form of a precoding matrix. The number of columns of the precoding matrix fed back by the terminal may be referred to as channel rank or rank indicator, RI. A precoding vector for each transmission layer may be represented as a linear combination of a set of spatial codebook basis vectors from a predetermined spatial codebook. The term "codebook basis vector" may be alternatively referred to as "basis vector". This set of spatial codebook basis vectors may be referred to as a first basis vector set. The linear combination of the first basis vector set may be represented by a set of weighting coefficients each comprising an amplitude and a phase. The terminal may determine the first basis vector set and calculate the set of weighting coefficients based on the measured CSI-RS and the first basis vector set, and further quantizes the amplitude and phase information of the weighting coefficients. The weighting coefficients for the first basis vector set may be referred to as a first coefficient set.

In order to improve the performance of the CSI feedback, it is usually necessary to report the amplitude and phase information of the first coefficient set for each frequency subband. A frequency subband represents a frequency domain granularity in precoding process. A frequency subband for CSI feedback may be configured by the wireless network node via resource allocation signaling. For all RBs included in the CSI feedback resource bandwidth, a consecutive number (M) RBs form one subband. The CSI feedback bandwidth may include N subbands of size M. In 5G wireless systems, for example, such a subband may be referred to as a PMI (Precoding Matrix Indicator) subband, which may be equal to the CQI (Channel Quality Information) subband, or 1/R of the CQI subband, where R is a positive integer.

For the above CSI feedback method by the terminal, for the nth subband (n=1, ... N), the precoding vector $f_n$ of a certain transmission stream or layer can be expressed as:

$$f_n = W_1 c_n$$

wherein, $W_1$ includes the first basis vector set (spatial domain basis vectors), and $c_n$ is a vector formed by the first coefficient set. In general, the information in may be for broadband feedback. In other words, the information in $W_1$ may be the same for different frequency subbands (different index n) in the entire CSI feedback bandwidth. Specifically, the number of spatial codebook basis vectors included in the first basis vector set included in $W_1$ may be L. Correspondingly, the first coefficient set vector $c_n$ may be a vector of dimension L. The number of L spatial codebook basis vectors are selected from the predetermined spatial codebook. In other words, the number of columns of $W_1$ may be L. For example, $W_1$ may be a block diagonal matrix, and the vectors contained in $W_1$ are the first basis vector set. For the precoding vector $f_n$, the first coefficient set vector $c_n$ of all subbands may be represented by the following first coefficient matrix C.

$$C = \begin{bmatrix} c_{11} & \cdots & c_{1N} \\ \vdots & \ddots & \vdots \\ c_{L1} & \cdots & c_{LN} \end{bmatrix}$$

Each column of the first coefficient matrix C include one of the $c_n$ vectors. If the amplitude and phase information of the elements in the feedback C matrix is directly quantized, a large feedback overhead may be incurred. As shown below, compression of the C matrix along the subband dimension may help reduce the feedback overhead for the weighting coefficients without much sacrifice on performance, by taking advantage of frequency domain correlation between the weighting coefficients.

Specifically, the C matrix may be transformed by conjugate transposition to obtain $C^T$. The column vectors of $C^T$ may be represented by $b_l$ (l=1, ..., L). The terminal may then select another basis vector set $D_l$ from a second codebook (frequency domain codebook), referred herein as a second basis vector set (frequency domain basis vector set), and represent $b_l$ as a linear combination of basis vectors of the second basis vector set with a second coefficient set $a_l$:

$$b_l = D_l a_l$$

where $b_l$ is an N-dimensional vector. The second basis vector set $D_l$ includes a total of K vectors, and the second coefficient set $a_l$ is a K-dimensional vector. Each element of $a_l$ includes an amplitude and a phase. The terminal calculates and identifies $D_l$ and $a_l$, and feeds back $W_1$, $D_l$ and $a_l$ in the CST report to the wireless access network node. $D_l$ may be the same for all l, or may be different. When $D_l$ is the same for all l, it may be represented simply by D.

Because of correlation in the frequency domain, the dimension of the $a_l$, K, may be significantly smaller than N. As such, the information to be fed back for $a_l$ may be smaller than that of $c_n$ above, improving feedback overhead.

In some implementations, the first basis vector set above may include a set of column vectors in the identity matrix, or Kronecher product of orthogonal DFT vectors or DFT vectors. The second basis vector set may include DFT vectors.

Precoding the CSI-RS Using Candidate First Basis Vector Sets

In some implementation, the transmission end, e.g., the wireless access network node, can estimate candidate first basis vector set(s) prior to transmitting the CSI-RS. The transmitting side then process (precode or map) the CSI-RS as described below before transmitting the CSI-RS to the receiving end for CSI measurement and feedback. As such, the transmitting end can provide this candidate codebook basis vector information to improve the performance of the CSI feedback from the receiving end (e.g., the wireless terminal device), and/or to reduce the CSI feedback overhead. More specifically, the CSI feedback mechanism may be enhanced to provide improved measurement of the CSI-RS and more accurate determination of the CSI feedback (selection of basis vectors, determination of the various matrices and weighting coefficients above). For example, more suitable precoding matrices (basis vector sets) may be identified (e.g., selected from the candidate basis vectors) by the receiving end. Further, more accurate weighting coefficient vectors may be calculated by the receiving end. The determination of the candidate basis vectors from a predetermined codebook by the transmitting end may be based on various means. For example, it may be based on analysis by the transmitting end of one or more other reference signals received by the transmitting end from the receiving end, e.g., a sounding reference signal (SRS) transmitted from the receiving end to the transmitting end, under the principle and assumption of reciprocity of uplink and downlink channel characteristics.

In some implementations, the CSI-RS may be processed or mapped by the transmitting end using the candidate first basis vector set (spatial domain basis vectors) prior to transmission. In particular, if the first basis vector set include a set of column vectors in the unit matrix, the CSI-RS may be precoded by the candidate first basis vector set. In other words, the wireless access network node may obtain the candidate first basis vector information in some manner and load the candidate first basis vector information into the CSI-RS during transmission. For example, CSI-RSs of L transmission ports may be mapped on the antennas by precoding, and transmitted to the terminal. The terminal may feed back transmission port selection information through a relined first basis vector set selection (spatial or port basis vector selection).

In some other implementations, the wireless access network node may obtain a candidate set of first basis vectors (spatial domain basis vectors) and candidate set of second basis vectors (frequency domain basis vectors) in some manners. Further, the wireless access network node may send a precoded or virtualized CSI-RS precoded/mapped with information of the two candidate basis vector sets to the terminal. The terminal receives and measures the CSI-RS and may determine the candidate basis vector sets recommended by the wireless access network node and select a refined or optimal first basis vector set and second basis vector set from the candidate basis vector sets. The terminal may further determine the second weighting coefficient set (see above) and feedback optimal second weighting coefficient information to the wireless access network node. The determination of the candidate sets of first basis vectors and second basis vectors may be based on measurement by the wireless access network node of one or more other reference signals, e.g., SRS, received by the wireless access network node from the terminal, under the principle and assumption of reciprocity of uplink and downlink channel characteristics. In these examples, the first basis vector set and the second basis vector set may comprise sets of column vectors in the unit matrix.

Figure 2:
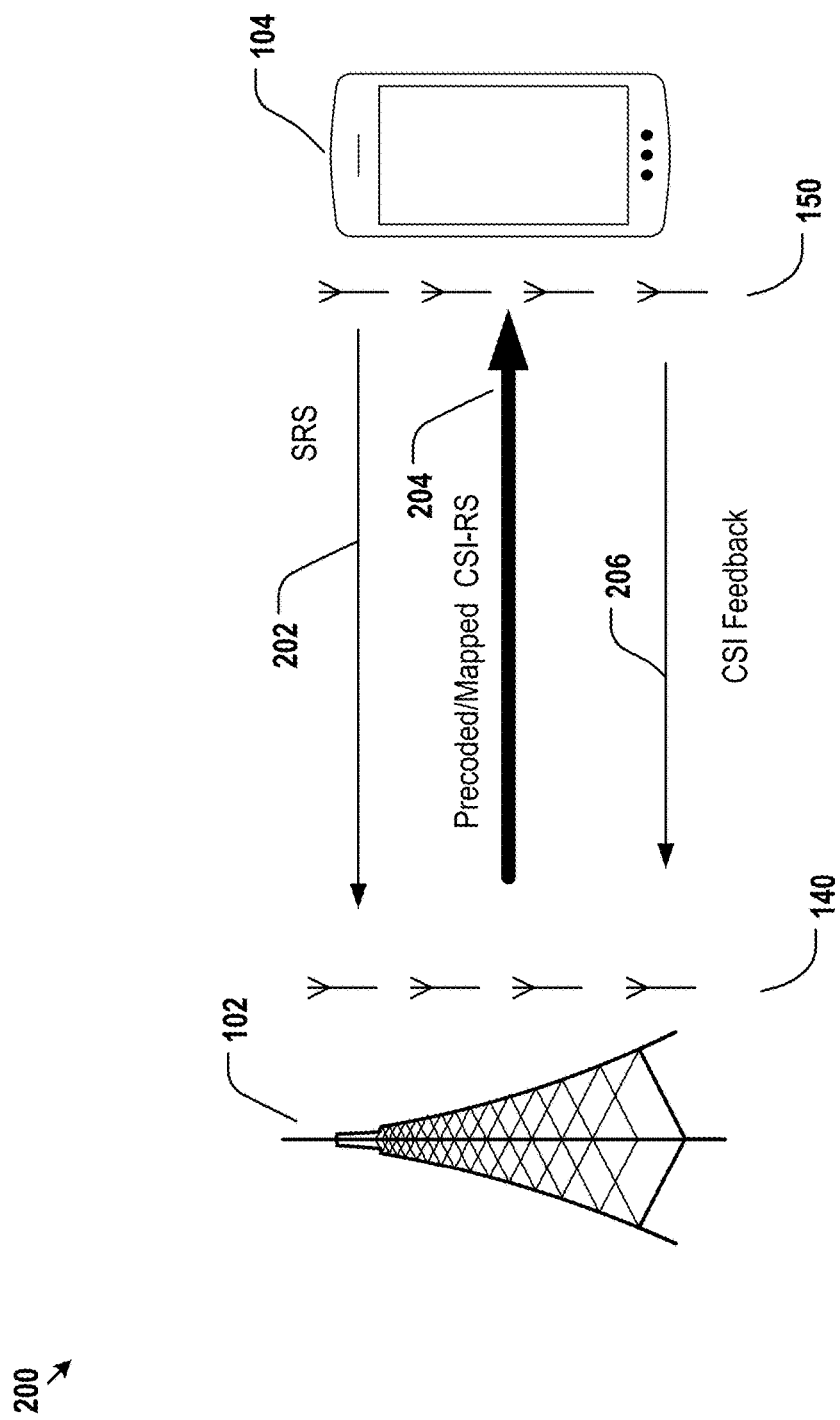
FIG. 2 illustrates principles for precoding channel state information reference signal by the wireless access network node of FIG. 1 for improving channel state information feedback by the user equipment of FIG. 1.

The underlying principles of the implementations above are illustrated in FIG. 2. Specifically, the CSI feedback mechanism 200 shown in FIG. 2 includes precoding/mapping the CSI-RS for transmission by the wireless access network node 102 (shown as 204) using information it obtains by measuring the SRS from the terminal 104 (shown as 202). As a result of the additional precoding matrix information (candidate basis vector information) carried by the CSI-RS, the CSI feedback 206 including codebook basis vector selection and corresponding weighting coefficients may be more accurate and more efficiently transmitted.

The precoding/mapping step 204 of FIG. 2 may be implemented in various manners. For example, CSI-RS sequences of L transmission ports may be mapped to a set of groups of frequency domain radio resources using a matrix (the matrix generally includes a vector) $W_{map}$. The set of mapped frequency radio resources within resources allocated to the CSI-RS may be referred to as first radio resources (or radio resource allocation(s)). The first radio resources may be configured as groups of first radio resources. Each group of first radio resources may include multiple radio resource blocks (RBs). The distribution of the groups of first radio resources in the radio resource allocation(s) may be determined by the mapping $W_{map}$. Because the mapping is determined $W_{map}$, which may include the CSI-RS preceding/mapping information (e.g., candidate basis vector set information), the candidate basis vector information would be precoded/mapped in the manner in which the groups of first radio resources are distributed in the radio resource allocation(s) for the CSI-RS. The implementations below describe various exemplary manners for mapping between the CSI-RS sequence and the radio frequency resources.

In a first exemplary mapping implementation for a particular CSI-RS port l in the CSI-RS of the L transmission ports, elements of the CSI-RS sequence $s_l^{(m)}$ may be mapped to N radio resource elements (NEs) as:

$$s_l^{(m)} f_m^T$$

In other words, the port l CSI-RS sequence $s_l^{(m)}$ is mapped to N REs by $s_l^{(m)^T} \odot f_m^T$, where symbol $\odot$ denotes element-by-element product. The vector $f_m$ is an N-dimensional column vector representing a candidate basis vector (e.g., second basis vector or frequency domain basis vector). M candidate vectors may be provided (m=1, ..., M). On these N CSI-RS REs, the transmitted signal by the transmitting end may be expressed as:

$$\text{vec}(X_{l,m}) = \text{vec}(v_l s_l^{(m)} f_m^T) = \text{vec}(v f_m^T) s_l^{(m)}$$

where $v_l$ represents a precoding vector that maps the CSI-RS on port l to multiple transmitting antennas.

Ignoring noise and interference, the signal received and measured by the terminal may be denoted as:

$$y_{l,m} = \begin{bmatrix} H_1 & & \\ & \ddots & \\ & & H_N \end{bmatrix} vec(X_{l,m}) = \begin{bmatrix} H_1 & & \\ & \ddots & \\ & & H_N \end{bmatrix} vec(v_l f_m^T) s_l^{(m)}$$

where $H_n$ represents the channel matrix on the nth CSI-RS RE. Knowing $y_{l,m}$ and $s_l^{(m)}$, $$z_{l,m} = \begin{bmatrix} H_1 & & \\ & \ddots & \\ & & H_N \end{bmatrix} vec(v_l f_m^T)$$

may be solved by the terminal. Further, the feedback precoding matrix may be determined by $$vec(W) = \Sigma_{l,m} c_l^{(m)} vec(v_l f_m^T).$$

In other words, the optima precoding is a linear combination of $vec(v_l f_m^T)$. Therefore, the strongest eigenvector for $Z^H Z$ may be the optimal solution of weighting coefficients $c_l^{(m)}$, where Z is a matrix comprising L*M column vector $z_{l,m}$.

As such, in the implementation above, the CSI-RS sequences of L transmission ports is linearly transformed or mapped to radio resources using vector $f_m^T$ as the mapping matrix $W_{map}$ for each group of the groups of first radio resources. The index m=(1, ..., M) represents the M groups of first radio resources.

Figure 3:
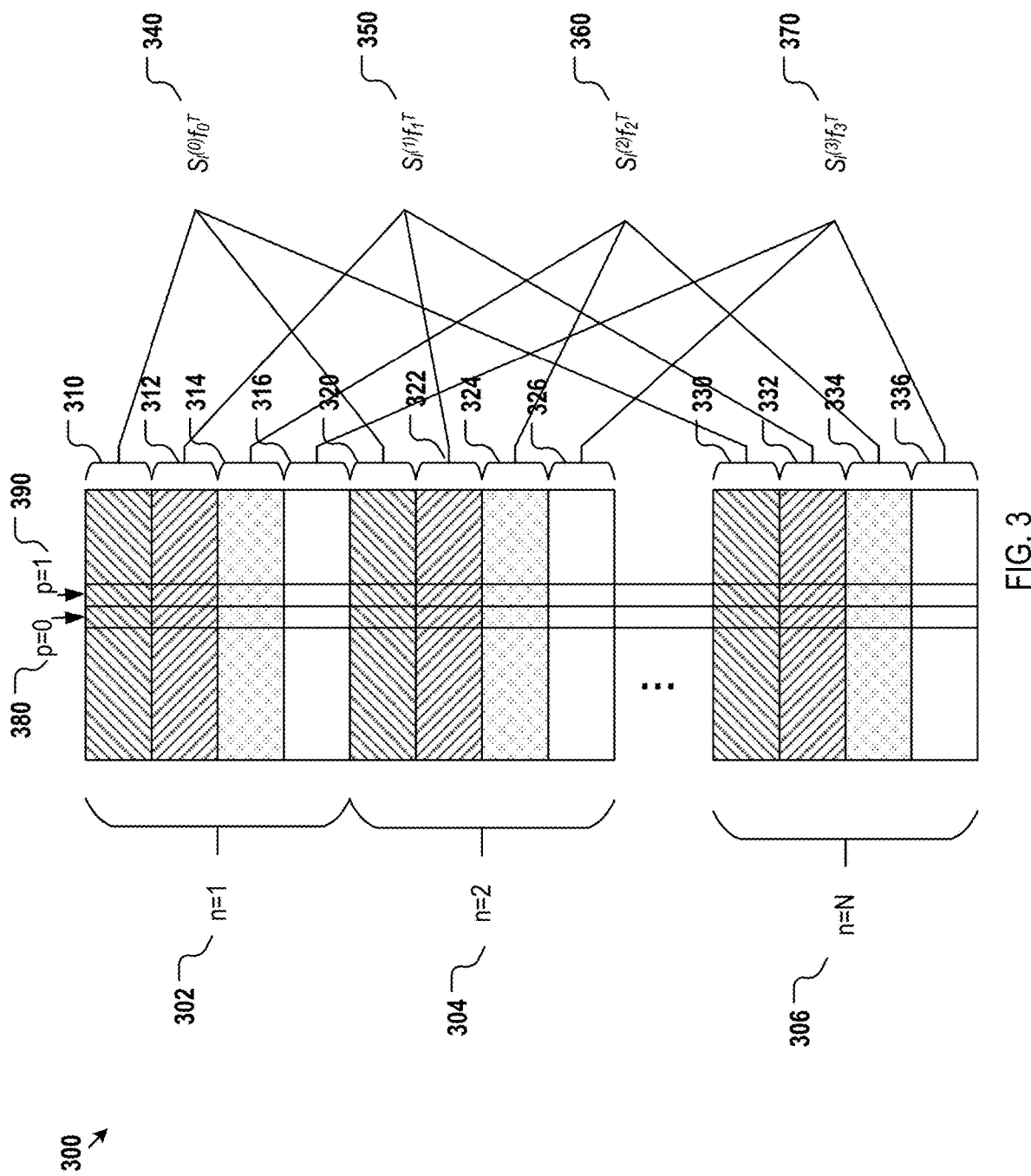
FIG. 3 illustrates an exemplary mapping between elements of a channel state information reference sequence and a plurality of radio resource blocks.

FIG. 3 illustrates such resource matching within the first group of radio resources. FIG. 3 shows first radio resources 300 for transmitting CSI-RS containing a plurality of RBs shown as various shaded or unshaded horizontally elongated boxes. The plurality of RBs include an exemplary M=4 groups of RBs where each groups of RBs are represented by one type of shading. For example, RBs 310, 320, and 330 belong to a one group, RBs 312, 322, and 332 belong to another group, RBs 314, 324, and 334 belong to a third group, and RBs 316, 326, and 336 belong to a fourth group. Each group may include N RBs, as indicated by 302, 304, and 306. The mapping between elements of the CSI-RS sequence and the resource blocks are illustrated by 340, 350, 360, and 370. For example, 340 shows that the $0^{th}$ element of the CSI-RS sequence is mapped to N RBs indicated by 310, 320, ..., 330 via the N components of $f_0$; 350 shows that the $1^{st}$ element of the CSI-RS sequence is mapped to N RBs indicated by 312, 322, ..., 332 via the N components of $f_1$; 360 shows that the $2^{nd}$ element of the CSI-RS sequence is mapped to N RBs indicated by 314, 324, ..., 334 via the N components of $f_2$; and 370 shows that the $3^{rd}$ element of the CSI-RS sequence is mapped to N RBs indicated by 316, 326, ..., 336 via the N components of $f_3$.

Each port corresponds to one RE in the RBs. As illustrated in FIG. 3, resource elements 380 are spatial port 0, and resource elements 390 are for spatial port 1, and so on. In some implementations, not all REs in a mapped RB are mapped to CSI-RS sequence elements.

As shown above and in FIG. 3, the first exemplary mapping implementation achieves mapping of CSI-RS sequence of a particular spatial port to N*M RBs. In the Example of FIG. 3, each of the box shown as representing an RB may alternatively represent any other number of RBs.

In a second exemplary mapping implementation for a particular CSI-RS port l in the CSI-RS of the L transmission ports, the CSI-RS sequences of L spatial transmission ports (e.g., after space virtualization) may be transmitted on N RBs (rather than N*M RBs in the first exemplary mapping implementation above). In contrast to the first exemplary mapping implementation above, the CSI-RS sequences of the L spatial ports are not mapped on the N RBs in a direct manner, but are mapped to N RBs after performing frequency domain precoding processing through the frequency domain basis vectors (second basis vectors).

Specifically, CSI-RS sequence $\{s_l^{(1)}, \ldots, s_l^{(M)}\}$ of length M for the lth spatial port may be mapped on N RBs in the following manner.

$$\begin{bmatrix} s_l^{(1)} & \ldots & s_l^{(M)} \end{bmatrix} \begin{bmatrix} f_1^T \\ \vdots \\ f_M^T \end{bmatrix}$$

where $f_m$ may be an N*1 DFT vector (e.g., a second basis vector), and the wireless access network node can perform PDP detection using the SRS to obtain $f_m$ (e.g., included in the FD basis information).

For each spatial port l, the CSI-RS signal transmitted on the N RBs and P antennas is:

$$X_l = v_l \begin{bmatrix} s_l^{(1)} & \ldots & s_l^{(M)} \end{bmatrix} \begin{bmatrix} f_1^T \\ \vdots \\ f_M^T \end{bmatrix} = v_l \begin{bmatrix} s_l^{(1)} & \ldots & s_l^{(M)} \end{bmatrix} F^T$$

Ignoring interference and noise, the signal received by the terminal is:

$$y_l = \begin{bmatrix} H_1 & & \\ & \ddots & \\ & & H_N \end{bmatrix} vec(X_l) = \begin{bmatrix} H_1 & & \\ & \ddots & \\ & & H_N \end{bmatrix} (F \otimes v_l) s_l$$

It can be seen from the above two equations that the transmitted frequency-domain virtualized CSI-RS, after signal processing, the estimated equivalent channel matrix is:

$$\begin{bmatrix} H_1 & & \\ & \ddots & \\ & & H_N \end{bmatrix} (F \otimes v_l).$$

which is a channel on a new domain after a two-dimensional transformation of the channel matrix H.

For such an equivalent channel matrix, optimal weighting coefficient information may be derived by the terminal using $W = VCF^T$, where C represents the coefficient matrix $$C = \begin{bmatrix} c_1^{(1)} & \ldots & c_1^{(M)} \\ \vdots & \ddots & \vdots \\ c_L^{(1)} & \ldots & c_L^{(M)} \end{bmatrix}$$

Further, $vec(W) = (F \otimes V) vec(C)$, indicating that the optimal coefficient matrix C include coefficients on the new domain that matching the channel characteristics the most after the two-dimensional transform ($F \otimes V$). Therefore, in some implementations, the $$\begin{bmatrix} H_1 & & \\ & \ddots & \\ & & H_N \end{bmatrix}(F \otimes v_l)$$

can be subject to SVD decomposition to obtain the strongest eigenvector as the optimal vec(C), which may be quantized for feedback to the wireless access network node.

Figure 4:
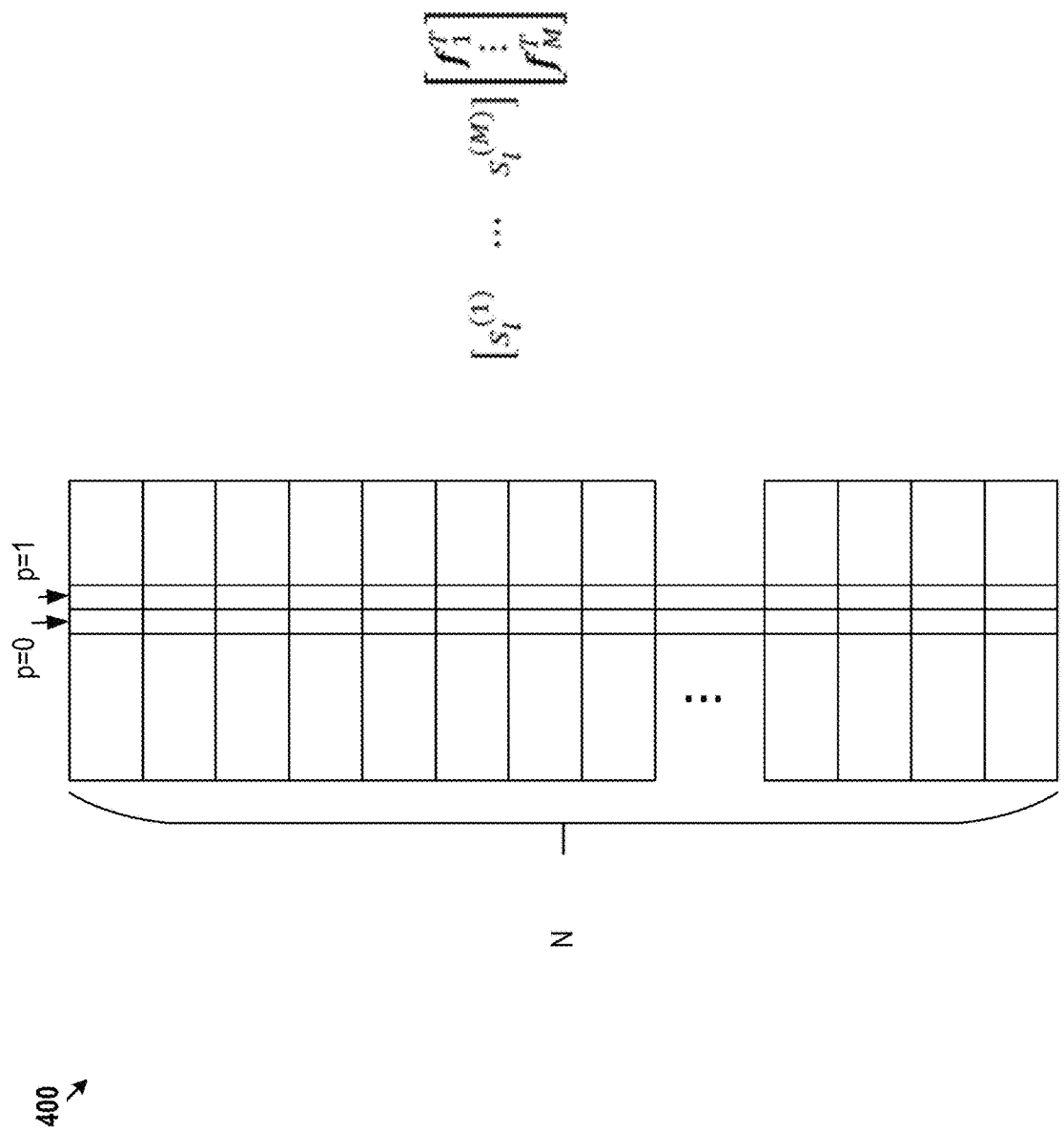
FIG. 4 illustrates another exemplary mapping between elements of state information reference sequence and a plurality of radio resource blocks.

The second exemplary mapping implementation above is further illustrated in FIG. 4.

In a third exemplary mapping implementation for a particular CSI-RS port l in the CSI-RS of the L transmission ports, the CSI-RS sequences of L spatial transmission ports (e.g., after space virtualization) may be transmitted on M RBs (rather than N*M RBs in the first exemplary mapping implementation above or N RBs in the second exemplary mapping implementation above). For a CSI-RS port l, a CSI-RS sequence $$\begin{bmatrix} s_l^{(1)} \\ \vdots \\ s_l^{(N)} \end{bmatrix}$$

of length N may be mapped to a CSI-RS resource elements using:

$$f_m^T \begin{bmatrix} s_l^{(1)} \\ \vdots \\ s_l^{(N)} \end{bmatrix}$$

The CSI-RS signal transmitted on the actual P antennas is $$v_l f_m^T \begin{bmatrix} s_l^{(1)} \\ \vdots \\ s_l^{(N)} \end{bmatrix}$$

Thus, on M CSI-RS RBs (M<N), one RE is used to transmit the above signals on each RB, and the CSI-RS signals mapped on the M RBs are $$\begin{bmatrix} f_1^T \\ \vdots \\ f_M^T \end{bmatrix} \begin{bmatrix} s_l^{(1)} \\ \vdots \\ s_l^{(N)} \end{bmatrix}$$

In this manner, the frequency domain signal is transformed into the delay time-domain by a linear transformation, and only M RBs are used to estimate the CSI on the N RBs, further reducing CSI overhead.

In fact, the final precoding matrices for each RB can be written as a linear combination of $v_l f_m^T$ $$W = VCF^T = \sum_{l,m} c_l^{(m)} v_l f_m^T$$

Therefore, if only power detection is used, the CSI-RS configures above can provide detection of the strength of different spatial and frequency domain basis vectors with minimum resource consumption.

Figure 5:
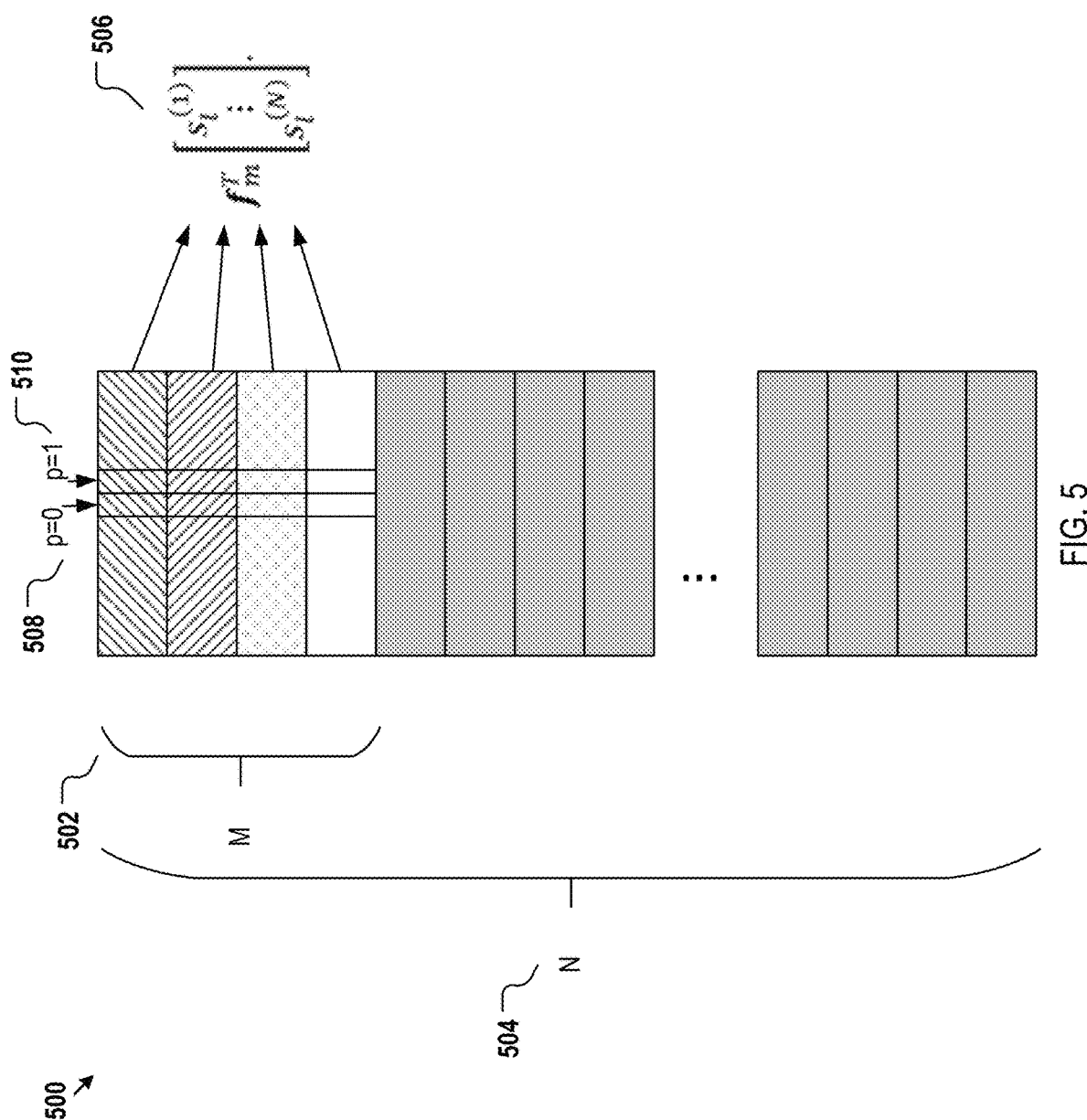
FIG. 5 illustrates another exemplary mapping between elements of a channel state information reference sequence and a plurality of radio resource blocks.

The third exemplary mapping implementation above is further illustrated in FIG. 5. Specifically, FIG. 5 shows that the mapping 506 maps N-element CSI-RS sequence to M resource blocks 502 among N resource blocks 504. Each spatial port corresponds to a resource element in the M resource blocks 502, as shown by 508 and 510.

In the three exemplary mapping implementations above, the CSI-RS sequence (or elements in the sequence) is mapped to the frequency domain first resource by a linear transformation (e.g., a matrix multiplication transformation or an element-by-element product involving the mapping matrix $W_{map}$. The resource mapped to the CSI-RS corresponding to $W_{map}$ among the resource allocation for the CSI-RS may be referred to as groups of first frequency domain resource. Further, the number of rows or the number of columns of $W_{map}$, for the various implementations, for example, may be the following.

number of RBs included in CSI-RS bandwidth (or associated/corresponding CSI bandwidth) (e.g., N above),
  a number of frequency domain source groups (e.g., M)
  One of the number of rows or columns of $W_{map}$ may be equal to 1.

Specifically, for a certain CSI-RS port l, the manner in which the corresponding CSI-RS sequence is mapped to the video resource may be based on at least one of the following:

Exemplary mapping 1:

$$\begin{bmatrix} s_l^{(1)} & & \\ & \ddots & \\ & & s_l^{(M)} \end{bmatrix} \begin{bmatrix} f_1^T \\ \vdots \\ f_M^T \end{bmatrix},$$

where a CSI-RS sequence of length M is mapped to N*M RBs, and the $W_{map}$ is a matrix of dimension M*N.

Exemplary mapping 2:

$$\begin{bmatrix} s_l^{(1)} & \cdots & s_l^{(M)} \end{bmatrix} \begin{bmatrix} f_1^T \\ \vdots \\ f_M^T \end{bmatrix}$$

where a CSI-RS sequence of length M is mapped to N RBs, and the $W_{map}$ is a matrix of dimension M*N.

Exemplary mapping 3:

$$\begin{bmatrix} f_1^T \\ \vdots \\ f_M^T \end{bmatrix} \begin{bmatrix} s_l^{(1)} \\ \vdots \\ s_l^{(N)} \end{bmatrix},$$

where a CSI-RS sequence of length N is mapped to M RBs and the $W_{map}$ is a matrix of dimension M*N.

In order to achieve better measurement of the second basis vector information over the entire bandwidth, the CSI-RS sequence pattern in each of the exemplary mapping above, in particular, the distribution of groups of first frequency domain resource over the entire CSI-RS allocation bandwidth, may follow at least one of the several patterns:

Pattern 1: One or more groups of first frequency domain resource each occupy consecutive RBs in the entire CSI-RS bandwidth.
  Pattern 2: one or more groups of first frequency domain resource is distributed as a comb over the entire CSI-RS bandwidth.

Figure 6:
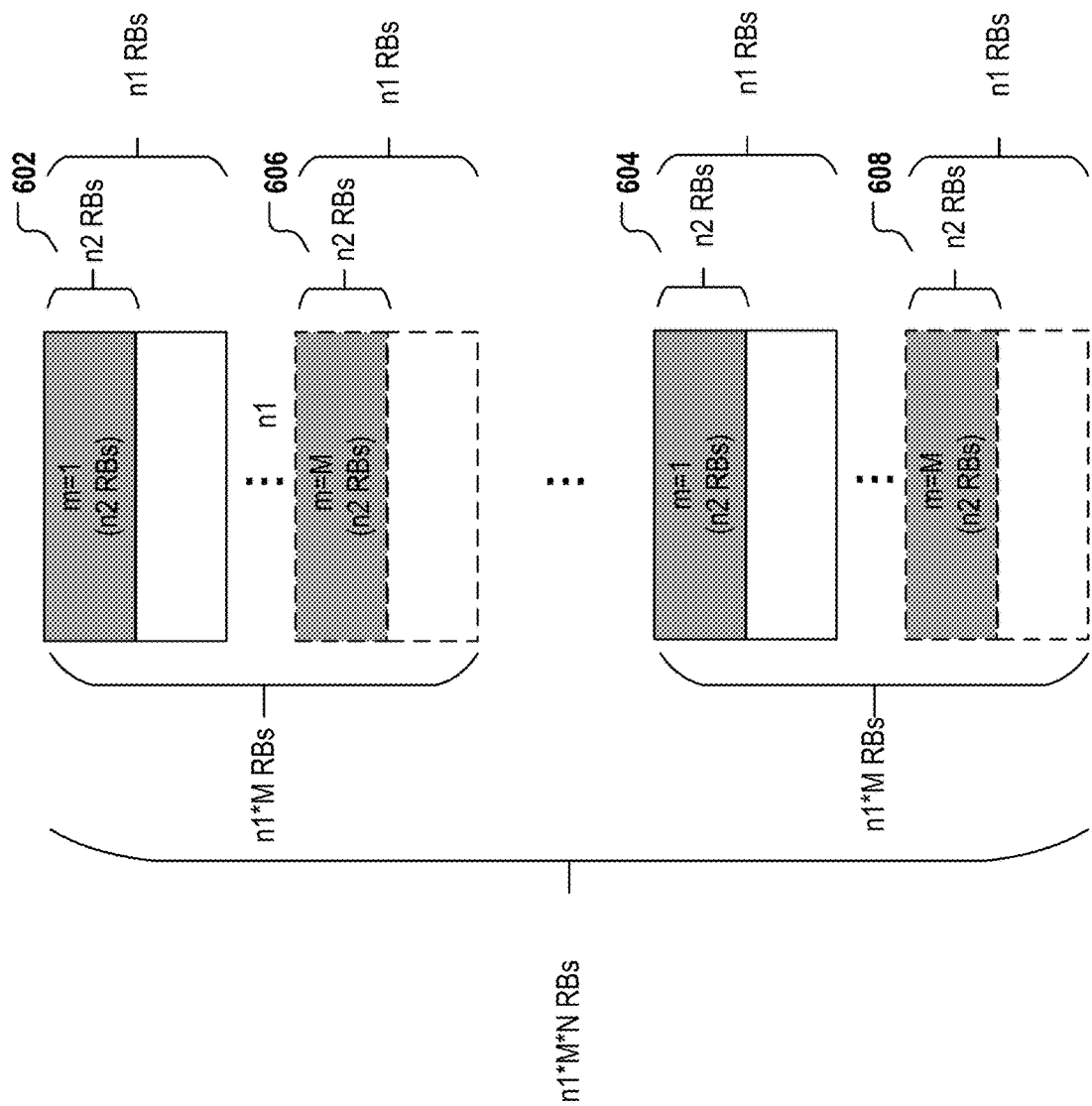
FIG. 6 illustrates a resource block configuration for a channel state information reference signal.

Pattern 3: one or more groups of the first frequency domain resource each occupy n2 RBs every n1 RBs in the CSI-RS resources and allocation(s). Specifically, assume that the entire CSI-RS bandwidth includes C RBs, denoted by RB {1, . . . , C}, and a certain first frequency domain resource group occupies RB {n0+i+n1*j}, where n0 and n1 are positive integers greater than or equal to 1, i is an integer between and including 0 and n2, j is an integer greater than or equal to 0, and n2 is a positive integer. In other words, the certain first frequency domain resource group occupies consecutive n2 RBs every n1 RBs. In some implementations, as shown in FIG. 6, M first frequency domain resource groups may be configured (resource blocks of different line types in FIG. 6 represent different groups), and the mapping matrix $f_m$ on each frequency domain resource group may be an N-dimensional column vector. Then the mth frequency domain resource group occupies RB {(m−1)*n1+i+n1*M*j} (for example, in FIG. 6, group m=1 occupies 602 and 604, group m=M occupies 606 and 608) where i=1, . . . , n2, j=0, . . . , N−1. For the mth frequency domain resource group, among the total n2*N RBs occupied, the kth element the CSI-RS sequence s, is mapped for transmission to the terminal by $f_m^T$ as represented by $sf_m^T$ to RBs {k, k+N2, . . . k+(n2−1)N} among the n2*N RBs where k=1, . . . , n2. In other words, the kth element the CSI-RS sequence s is mapped to RB {(m−1))*n1+k+n1*M*j} of the entire bandwidth. The values for n1 and n2 above may be set as fixed numbers. Alternatively, n1 and n2 may be configured via signaling, such as radio resource control (RRC) signaling.

After the CSI-RS is transmitted by the wireless access network node to the terminal, the terminal measures the CSI-RS and measures CSI according to corresponding CSI setting, where the CSI includes information for selecting the first frequency domain resource groups as discussed above and weighting coefficient amplitude and/or phase information corresponding to the selected first frequency domain resource group.

The related parameters of the first frequency domain resource group and some parameters set for CSI may be related to each other. For example, the number of the first frequency domain resource groups associated with a CSI report may be related to a size of the subband (or CSI subband) for the CSI report, where the subband may be a CQI subband or a PMI subband. Specifically, each CQI subband may correspond to one subband. CQI value, and each PMI subband may correspond to one precoding matrix, and the size of a CQI subband may be an integer multiple of the size of a PMI subband. For example, the number of RBs included in each subband may be equal to the number of first frequency domain resource groups multiplied by the number of RBs of each first frequency domain resource group within the subband. Further, in each subband, the RBs occupied by the first frequency domain resource group in the subband may be continuous. Alternatively, the RBs occupied by portion of the first frequency domain resource group within the subband may be distributed in as a comb within the subband. For a comb distribution within a certain subband, the mth first frequency domain resource group of the M first frequency domain resource groups occupies {m+M*i} RBs of the subband, where i=0, . . . , R−1 and R is a positive integer greater than or equal to 1, indicating the number of RBs occupied by portion of each first frequency domain resource group within each subband. In a special case, the subband size may be equal to the number of frequency domain resource groups, as shown in some of the exemplary implementations above.

In some implementations, the number of selected first frequency domain resource groups by the terminal and the size of the subband size included in the CSI report may be related. Specifically, the size of the subband may be greater than or equal to the number of selected first frequency domain resource groups. For example, if the CSI feedback bandwidth or the number of subbands included in the CSI-RS bandwidth is S, then it may be required that the subband size be greater than or equal to p*S, where p is a positive real number less than 1. Further, it may be required that p*B/K is smaller than or equal to K, where K is the number of RBs included in the subband, and B is the number of RBs included in the CSI-RS or CSI bandwidth; or that $(MR)^2 \geq pB$, where M is the number of the first frequency domain resource group as configured, and R is the number of RBs occupied by each of the first frequency domain resource groups in each subband.

In some implementations, the number of rows or columns of the mapping matrix $W_{map}$ corresponding to a certain first frequency domain resource group is equal to the number of the first frequency domain resource group selected by the terminal for CSI report. For example, the number rows or columns of the mapping matrix may be p multiplied by the number of subband, rounded to nearest integer, where p is a positive real number less than one.

The above solution can be extended to using multiple CSI-RSs for CSI feedback. Specifically, in each of the CSI-RSs, the CSI-RS sequence is mapped to the frequency domain resource by linear transformation (for example, using mapping matrix $W_{map}$). Each of the CSI-RSs corresponds to a $W_{map}$. Further, in this type of CSI-RSs, the density of the CSI-RS RB in the entire bandwidth tray be low, for example, less than ½.

In some implementations, the terminal feeds hack a CSI report for one or more CSI corresponding to such one or more CSI-RSs. The terminal may calculate weighting coefficient information according to the selected CSI and/or port information in each selected CSI, and feeds back the weighting coefficient information to the wireless access network node.

In some implementations, in a CSI report, the related CSI-RSs may satisfy certain constraints. For example, the number of RBs included in each subband may be required to be equal to the number of CSI-RSs multiplied by the number of RBs that each CSI-RS occupies in each subband, with the latter may be determined by CSI-RS resource density multiplied by the number of RBs in the sub-band, wherein densities of all CSI-RSs are the same. It may also be required that K*d=1, where K is the number of CSI-RSs and d is the CSI-RS resource density. In a particular example, the subband size may be equal to the number of CSI-RSs, in which case the CSI-RS resource density is 1/subband size. In another example, if the number of reported CSI-RSs is p multiplied by number of subbands, then it may be required that the subband size is larger than or equal to p multiplied by the number of subbands, where p is a positive real number less than 1. Further, it may be required that p*B/size<=size, where "size" is the number of RBs included in the subband, and B is the number of RBs included in the CSI-RS or CSI bandwidth. In one example, the number of rows or columns of the mapping matrix $W_{map}$ corresponding to the CSI-RS resource is equal to the number of CRIs selected for reporting, which may be p multiplied by number of subbands, where p is a positive real number less than 1.

Finally and to summarize, the mapping implementation above (e.g., in FIG. 305) are merely examples. In general, CSI-RSs may be configured and provided with CSI-RS resource allocations for transmitting the CSI-IRs, Each CSI-RS resource allocation may include CSI-RS resource blocks. Each CSI-RS resource block may include CSI-RS resource element. For the mapping of CSI-RS sequences, one or more groups of CSI-RS resources may be selected from the CSI-RS allocations. Each group of CSI-RS resources may include one of: a group of CSI-RS resource allocations, a group of CSI-RS resource blocks, a group of CSI-RS resource elements. The CSI-RS sequences may be mapped to the one or more groups of CSI-RS resources.

In some implementations, CSI-RS resources that are within a group of the one or more groups of CSI-RS resources and that are mapped to a CSI-RS sequence corresponding to one CSI-RS port are associated with identical channel characteristics. In some other implementations, the one or more groups of CSI-RS resources are associated with different channel characteristics.

In some implementations, via the mapping above, a group of the one or more groups of CSI-RS resources may be distributed in the one or more CSI-RS resource allocations as a contiguous set of resource blocks, a comb structure of resource blocks, or a plurality of sets of a first predetermined number of contiguous resource blocks, separated by a second predetermined number of resource blocks.

In some implementations, the one or more CSI-RS resource allocations above may be associated with one or more CSI report settings which determines a number of CSI subbands (as described above, which can be CQI subbands or PMI subbands) and where in a number of resource blocks in one CSI subband is determined by a number of groups of CSI-RS resources multiplied by a number of resource blocks for a group of CSI-RS resources within the one CSI subband. Further, via the mapping above, resource blocks of the group of CSI-RS resources within the one CSI subband is distributed within the one CSI subband as a continuous set of resource blocks, a comb structure, or as a plurality of sets of a first predetermined number of contiguous resource blocks, separated by a second predetermined number of resource blocks. The values for the first predetermined number second predetermined number above may be set as fixed numbers. Alternatively, they may be configured via signaling, such as radio resource control (RRC) signaling. The above distribution of resource blocks for a group of CSI-RS resources in the entire CSI-RS resource allocation or within a CSI subband may be combined in any manner. The two sets of predetermined first number and second predetermined number may be the same or may be independent.

The term resource block (RB) is herein used to refer generally to a resource block in a resource allocation, such as a resource block allocated for any of the CSI/CSI-RS purposes. The term "CSI-RS resource block" is herein used to refer to a resource block within the resource blocks allocated for CSI-RS that are mapped to the CSI-RS sequence. Likewise, the term resource element (RE) is herein to refer generally to a resource element in any resource block. The term "CSI-RS resource element" is herein used to refer to a resource element within the resource elements that are mapped to the CSI-RS sequence in a CSI-RS resource block.

Transmitting Candidate Basis Vector Information Via Separate Channels

Alternative to the CSI-RS preceding or mapping described above, the candidate basis vector information may be transmitted to the terminal using explicit or implicit signaling. For example, the wireless access network node may inform the terminal of a candidate second basis vector set $\{d_1, d_2, \ldots, d_M\}$ as determined by the wireless access network node using an explicit or implicit signaling via corresponding signaling channels. The explicit signaling may include but is not limited to MAC CE signaling, whereas the implicit signaling may include but not limited to embedding the candidate basis vector information in CSI-RS related configuration parameters, such as sequence initialization parameters, cyclic shift parameters, and the like.

In some implementations, the wireless access network node may configure the candidate second basis vector information for selection by the terminal in a trigger signal of an aperiodic CSI-RS. For example, for a predefined second basis vector set, including M second basis vectors, the information about candidate second basis vector selected by the wireless access network node may be configured in the CSI-RS trigger signal for notification to the terminal in at least one of the following manners including but not limited to: (1) configuring the selection of the candidate second basis vectors as a bitmap, and (2) configuring the selection of the candidate second basis vectors using the combination number coding scheme of M-select K, where K is a positive integer less than or equal to M representing the number of candidate basis vectors.

While the description above refers to the second basis vectors and candidate second basis vectors (frequency domain basis vectors), the underlying principle applies to other basis vector sets.

CSI Compression

In a practical application scenario, the UE 104 of FIG. 1 may be a mobile terminal device and may move relative to the wireless access network node 102. Such a motion may lead to time variations of the characteristics of the wireless channels. The wireless channels are thus affected by Doppler Effect. In the case where the UE moves at an appreciable medium to high speed, the time variation of the wireless channel characteristics may need to be taking into consideration for the design and transmission of CSI-RS and CSI report. For example, CSI-RS may need to be respectively and frequently transmitted by the wireless access network node 102 and measured by the UE 104 such that the channel variation may be tracked throughout the motion of the UE 104. Frequent transmission of, for example, the CSI report, may appreciably increase the transmission overhead and decrease the radio resource utilization efficiency of the wireless system.

In some implementations, the CSI reports by the UE may be compressed in time such that not every CSI needs to be fed back. For example, a single CSI report may be feedback for multiple CSI-RSs. For another example, the number of CSI report may be smaller than the number of multiple CSI-RSs. In particular, a Delay Doppler method may be utilized to compress the characteristics parameters of the wireless channels by the UE in the time domain to reduce the time domain overhead of the CSI feedback. For example, the UE may only need to send a reduced number of, e.g., a single, CSI reports corresponding to a plurality of CSI-RSs received from the wireless access network node by the UE within a CSI-RS measurement window, where the CSI of a plurality of CSI-RSs are aggregated and time-compressed. After receiving the time-compressed CSI report(s), the wireless access network node recovers the CSI information for the measurement time window and extrapolates (or predict by periodicity) the channel information for a subsequent future period of time. As such, high precision CSI may be achieved with lower transmission overhead.

Figure 7:
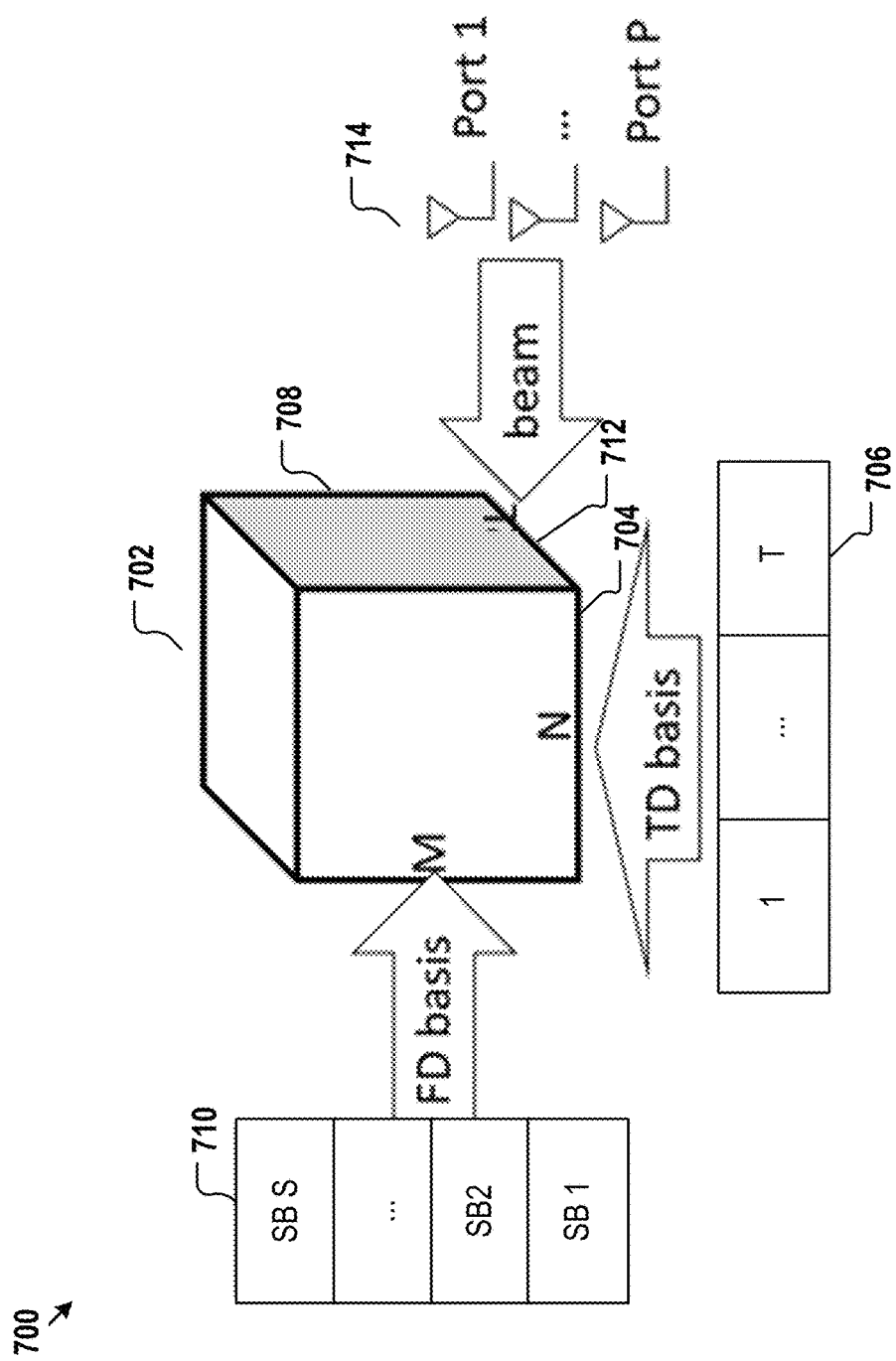
FIG. 7 illustrates principles for compression of weighting coefficients in channel state information.

The principles described above are further illustrated FIG. 7. Specifically, FIG. 7 shows compression of subband based CSI feedback. The underlying principles apply to other frequency domain CSI feedback. Cub 702 of FIG. 7 illustrates a compressed CSI feedback information, e.g., weighting coefficient matrix in a basis vector space as determined by the terminal from multiple CSI-RSs received in time. Dimension 704 of the compressed coefficient cube 702 shows a compressed time dimension representing the multiple CSI-RSs that may be transmitted in various time slots 706. The size of the original time dimension may be T and the compressed time dimension may be represented by N. Dimension 708 of the compressed coefficient cube 702 shows the subband dimension 710 (which, for example, is related to the number of the second basis vector set or the frequency domain basis vector set discussed above). The size of the original subband dimension may be S and it may compressed to M. Dimension 712 of the compressed coefficient cube 702 shows the transmission port (or spatial) dimension 714 (which is related to parameter L for the weighting coefficients for the second basis vector set or the frequency domain basis vector set discussed above). The spatial dimension 712 is shown as L (in some implementations, polarizations may be included in the spatial dimension. For example, considering two possible polarization basis, the combined spatial and polarization dimension may be of size 2 L). As described in more detail below, the task of compression is to compress an original weighting coefficient cube of dimensions L*S*T to the compressed weighting coefficient cube 702 of dimensions L*M*N by the terminal. The time dimension compression, in particular, may be achieved by exploring time domain correlation of the weighting coefficients. In such a manner, the information that needs to be transmitted for CSI can be reduced and the CSI transmission efficiency in radio resource consumption may be improved.

In some exemplary implementations under the principles described above, the spatial domain and frequency domain compression of the original weighting coefficients may be performed as below to obtain spatial and frequency compressed weighting coefficients C:

$$f_s^t = \begin{bmatrix} v_1, v_2, \ldots, v_{L/2} & 0 \\ 0 & v_1, v_2, \ldots, v_{L/2} \end{bmatrix} \begin{bmatrix} d_{1,s}^t \\ \vdots \\ d_{L,s}^t \end{bmatrix}$$

$$f_s^t = \begin{bmatrix} v_1, v_2, \ldots, v_{L/2} & 0 \\ 0 & v_1, v_2, \ldots, v_{L/2} \end{bmatrix} \begin{bmatrix} d_{1,s}^t \\ \vdots \\ d_{L,s}^t \end{bmatrix}$$

The spatial and frequency compressed weighting coefficient C on the T time slots forms a three-dimensional matrix of L*M*T, and the weighting coefficient vectors in the time dimension of size T is then compressed into the size N by DPT vectors (TD, or ante-domain basis). Specifically, the weighting coefficient time vector of size T for a particular spatial dimension (port or beam) l and frequency domain basis m may be compressed into size N following:

$$\begin{bmatrix} c_{l,m}^1 \\ \vdots \\ c_{l,m}^T \end{bmatrix} = \begin{bmatrix} v_1^{l,m} & \ldots & v_N^{l,m} \end{bmatrix} \begin{bmatrix} g_{l,m}^1 \\ \vdots \\ g_{l,m}^N \end{bmatrix}$$

The basis vectors $[v_1^{l,m} \ldots v_N^{l,m}]$ above for performing tinge domain compression may be referred to as a third basis vectors. Thus, the time-compressed weighting coefficients for a CSI layer of in a certain first basis vector (spatial) space and/or a certain second basis vector (frequency) space on T time slots are linear weighted combinations of N third basis vectors. The terminal determines or obtains the third basis vector information, and amplitude and/or phase information of the compressed weighting coefficients in the third basis vector space for feedback to the wireless access network node.

As discussed previously, the set of first basis vectors, the set of second basis vectors, and the set of third basis vectors may be from a first codebook, a second codebook, and a third code book, respectively. In addition, at least one of the set may be selected by the terminal from a corresponding set of candidate basis vectors. Such candidate basis vector sets may be configured by the wireless access network node.

Figure 8:
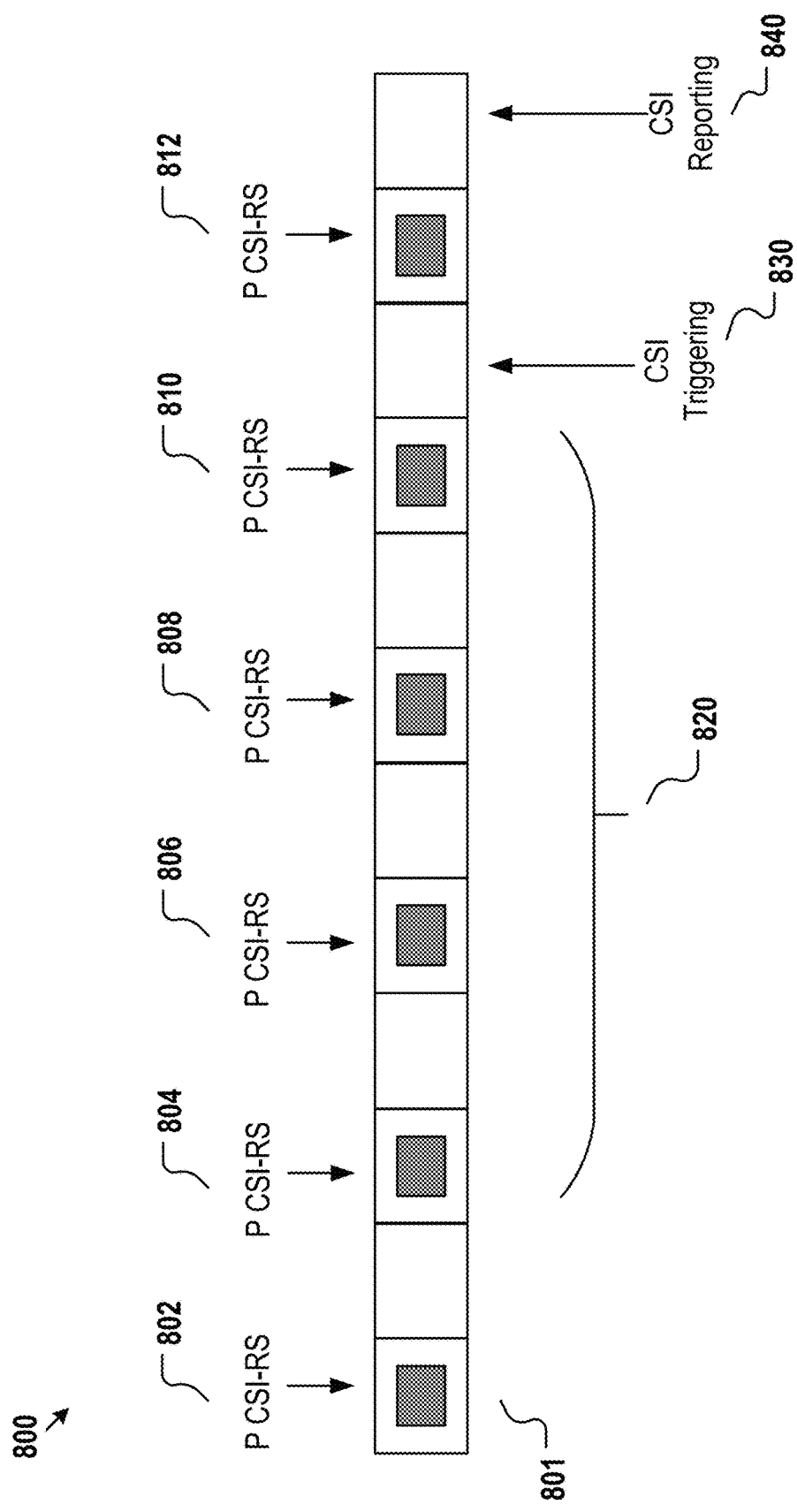
FIG. 8 illustrates an exemplary channel state information triggering and feedback scheme.
Figure 9:
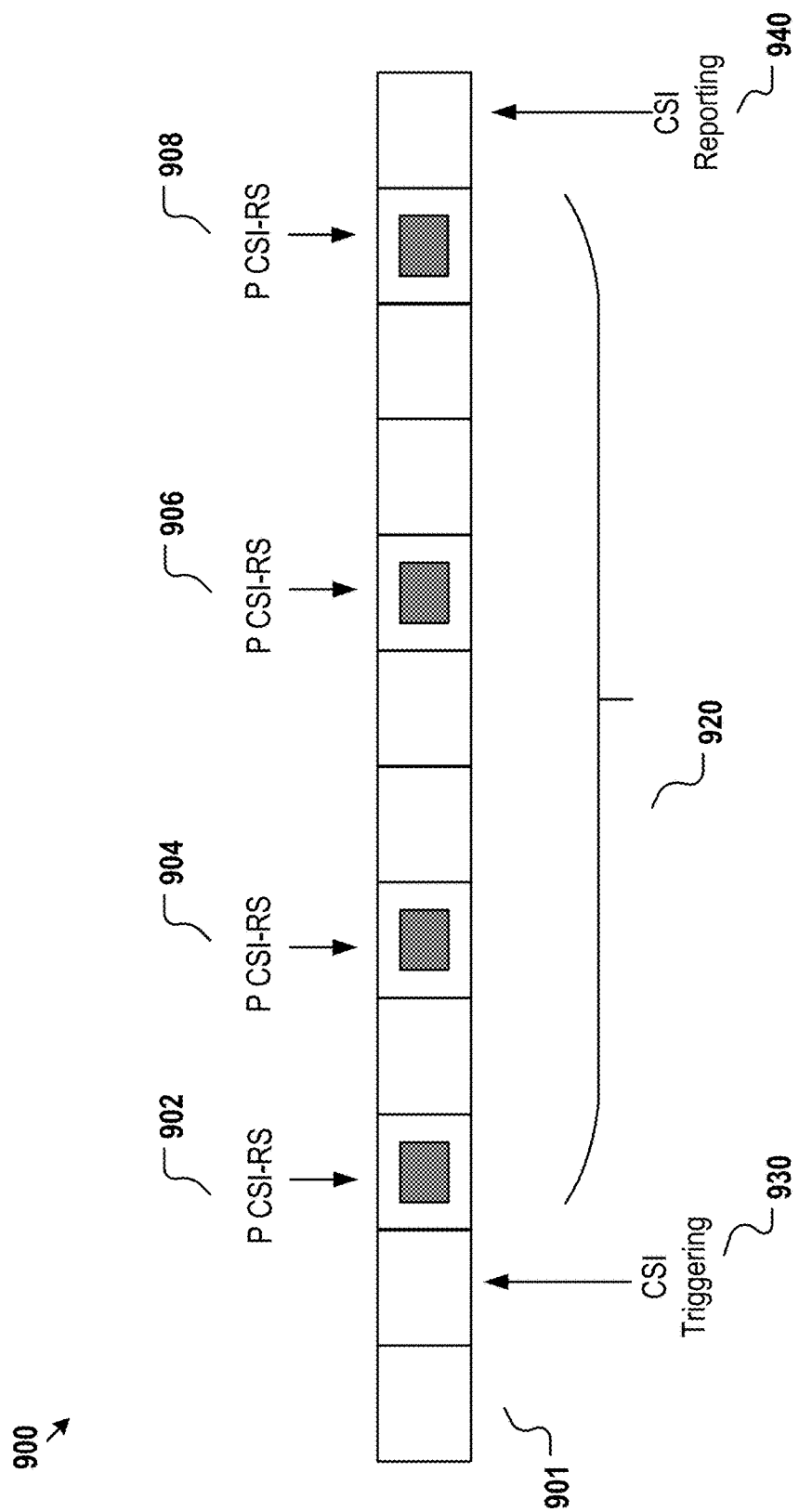
FIG. 9 illustrates another exemplary channel state information triggering and feedback scheme.

To compress the time-varying CSI by using the correlation of the CSI parameters in the time domain, multiple time domain samples of the CSI-RS, e.g., multi-slot CSI-RS, may be used, as shown in FIGS. 8 and 9.

FIG. 8 illustrates multi-time slot CSI-RS configuration 800 for periodic CSI-RS transmission and for triggering compressed CSI reporting. A measurement time window T (820) may be configured by the wireless access network node for the terminal. The CSI report may be triggered by a DCI or a specific CSI trigger signal, as shown by 830. In FIG. 8, the periodic CSI-RS are received by the terminal as shown by 802-812. The example of FIG. 8, the CSI-RSs are transmitted periodically and received by the terminal with a periodicity of two time slots. The time slots are shown by the empty boxes 801. The shaded boxes within the time slots represents the CSI-RSs. The time window T value may be measured in unit of the periodicity. The time window 820 encloses the CSR-RSs that the terminal is configured to measure and compress upon the CSI report is triggered by a DCC or a specific CSI triggering signal 830. Specifically, the terminal, once receiving the trigger 830, may begin compressing CSI information measured during the time window 830. Once the compression result is obtained, the terminal then transmit the CSI report to the wireless access network node, as shown by 840.

While in the example of FIG. 8, the terminal is configured to compress CS-RS measurement within a window of T immediately before the CSI triggering 830, in some other implementations, the terminal may be alternatively configured to use other time windows of T that is not later than the CSI triggering 830.

Further, in order to ensure that the first CSI feedback has sufficient number of CSI-RS to compress, it is may be necessary to limit the CSI triggering 830 to after transmission of at least the time window T.

This compression scheme above may increase the signal processing complexity of the terminal. In particularly, the terminal may be limited to the number of CSI-RSs it can process within a reasonable amount of time. The above scheme thus may further include mechanisms that can be used to ensure that the terminal does not have to operate beyond its capability. For example, the terminal may notify the wireless access network node of its capability by reporting a maximum time window $T_0$ according to its processing capability. As such, the wireless access network can configure the time window T for the terminal to be at most of value $T_0$. In some implementations a CSI reference resource may be specified to represent a reference time, and the triggering of the CSI report may be configured such that there may be no other CSI-RS between the CSI reference resource and the triggering 830, or there may be no other CSI-RS between (or between and including) the last symbol of the CSI reference resource and the first symbol of, e.g., the triggering 830. In such a manner, the terminal only needs to keep track of T number of most recent CSI-RSs preceding the CSI reference resource rather than more CSI-RSs, reducing the processing requirement of the terminal.

FIG. 9 further shows illustrates an exemplary multi-time slot CSI-RS configuration 900 for periodic CSI-RS transmission and for triggering compressed CSI reporting. In the implementation of FIG. 9, CSI may be triggered, as shown in 930, by, for example, DCI or other triggering signal, including a triggering CSI-RS, that may be sent from the wireless access network node to the terminal. The CSI triggering 930 may initiate a CSI measurements of subsequent. CSI-RSs (shown as 902-908) for compression and CSI reporting (shown as 940).

Such a triggering signal, e.g., a triggering CSI-RS, may be configured to include CSI report time information or configuration that the terminal may use to configure its CSI measurements, compression, and reporting. For example, the triggering information may include but not limited to:

A time slot offset indicating a number of time slots between a DCI or other signaling for triggering the CSI feedback and a first CSI-RS following the triggering signal.

The number of CSI-RSs for measurement and compression (e.g., 920 of FIG. 9, showing an exemplary number of CSI-RSs that are configured to be measured and compressed for reporting at 940). The number of CSI-RSs, in particular, may be configured to less than $T_0$ above (as reported by the terminal as a maximum number of CSI-RSs that the terminal can process for compression according the processing capability of the terminal).

Number of time slots between two adjacent CSI-RSs.

In the situation involving aperiodic CSI-RSs, a CSI-reference resource may also be specified to represent a reference time. The triggering of the CSI report may be configured such that there may be no other CSI-RS between the triggering 930 and the CSI reference resource, or there may be no other CSI-RS between (or between and including) the last symbol of the triggering 930 and the first symbol of the CSI reference resource.

In some other alternative implementations, a CSI triggering (such as DCI trigger) may trigger more than one multi-CSI-RS sets. Such multi-set configuration may be specified by a bitmap.

In the implementation illustrated in FIG. 9, because the CSI-RS is aperiodic or acyclic, the time needed to receive T number of CSI-RS may be too long. In some implementations, a separate threshold number $T_1$ may be configured such that if the time from the CSI trigger to the CSI report transmission is less than or equal to $T_1$, the CSI is directly transmitted. If, however, the time from the CSI trigger to the CSI report transmission is greater than $T_1$, the CSI is reported multiple times. Each time the content of the report is different. A DCI may trigger multiple such reports. The number of multiple CSI reports and the time interval between the CSI reports may be configured by the wireless access network node.

In some other implementations, the measurement e window T above may include aperiodic CSI-RSs prior to the triggering 930 as well as CSI-RSs after the CSI triggering 930. In other words, the CSI-RSs before and after the CSI triggering may be combined to generate the CSI report. These CSI-RSs may even be transmitted using different resource allocations but may be related with respect to transmission ports.

In some implementations, the rank indicator (RI) for the T time slots above may be the same. As such, only one RI may be fed back by the terminal. In some other exemplary implementations, each of the T time slot may have different RI and these different RIs be separately feedback in the compressed CSI report. In such situation, the PMI may be determined by the maximum value of the multiple RIs and then fed back to the wireless access network node.

Enhanced Transmission of Compressed CSI Report

In the compressed CSI feedback mechanism described above, after determination of the third basis vector, the size L*M*T weighting coefficient matrix may be compressed into a size L*M*N weighting coefficient matrix. The amplitude and phase information in the compressed weighting coefficient matrix needs to be fed back to the wireless access network node. In general, due to the sparsity of the transformed channel domain, most of the elements in the compressed coefficient matrix are zero element. As such, rather than reporting the entire matrix, only the position information and the amplitude/phase information of the nonzero elements need to be fed back, which can effectively reduce the CSI feedback overhead.

Several exemplary implementations for position information feedback for the nonzero elements in the L*M*N-dimensional weighting coefficient matrix are described below. In some exemplary implementations, the position of the nonzero elements may be fed back using a bit map. The dimensions of the bit map may be L*M*N.

In some other implementations, coordinate value (x, y, z) of each nonzero element in the three-dimensional coordinate system of (L, M, N) may be used for positional feedback as three separate positional indexes. A values (x, y, z) may be used as indexes or indicators for indicating that a nonzero coefficient is for the weighting coefficient for the xth first basis vector, the yth second basis vector, and the zth third basis vector. An specific coding of such position information, for example, (x, y, z) may be jointly coded with the bit width of $\log_2(L*M*N)$. Specifically, the value of a linearized index of the joint coding, i=L*x+M*y+z, or i=L*x+N*z+y, or i=M*y+N*z+x may be report. Alternatively, (x, y, z) may be independently reported. Specifically, the bit width for x, $\log_2$ (L), the bit width of y, $\log_2 M$, and the bit width of z, $\log_2 N$ may be reported.

In yet some other implementations, the L*M*N weighting coefficients may be divided into K groups, with each group having, for example, LMN/K coefficients. Correspondingly, the L*M*N vector space may be divided into K sub-vector spaces. Positional information of a nonzero element in a group may include three separate indexes/indicators for indicating the position of the nonzero element in corresponding sub-vector space. For the linearized index of joint coding i above, the value i'=mod (i, LMN/K) for nonzero elements within each group may be fed back instead. The weighting coefficients in different groups may be mapped in a certain predefined order. A fourth index may be used to identify a sub-vector space. In some implementations, for a total of $K_0$ nonzero coefficients, the starting position of the coefficients in each group is fed back using $(K-1)*\log_2(K_0)$ bits as the fourth index for identifying each group. For example, if the L*M*N weighting coefficients are divided into two groups, each group includes L*M*N/2 coefficients. The first and second group include weighting coefficients corresponding to the first half of the CSI-RS ports and the second half of the CSI-RS ports. The number of feedback bits for the starting position of the weighting coefficients in each group would be $\log_2 K_0$.

Figure 10:
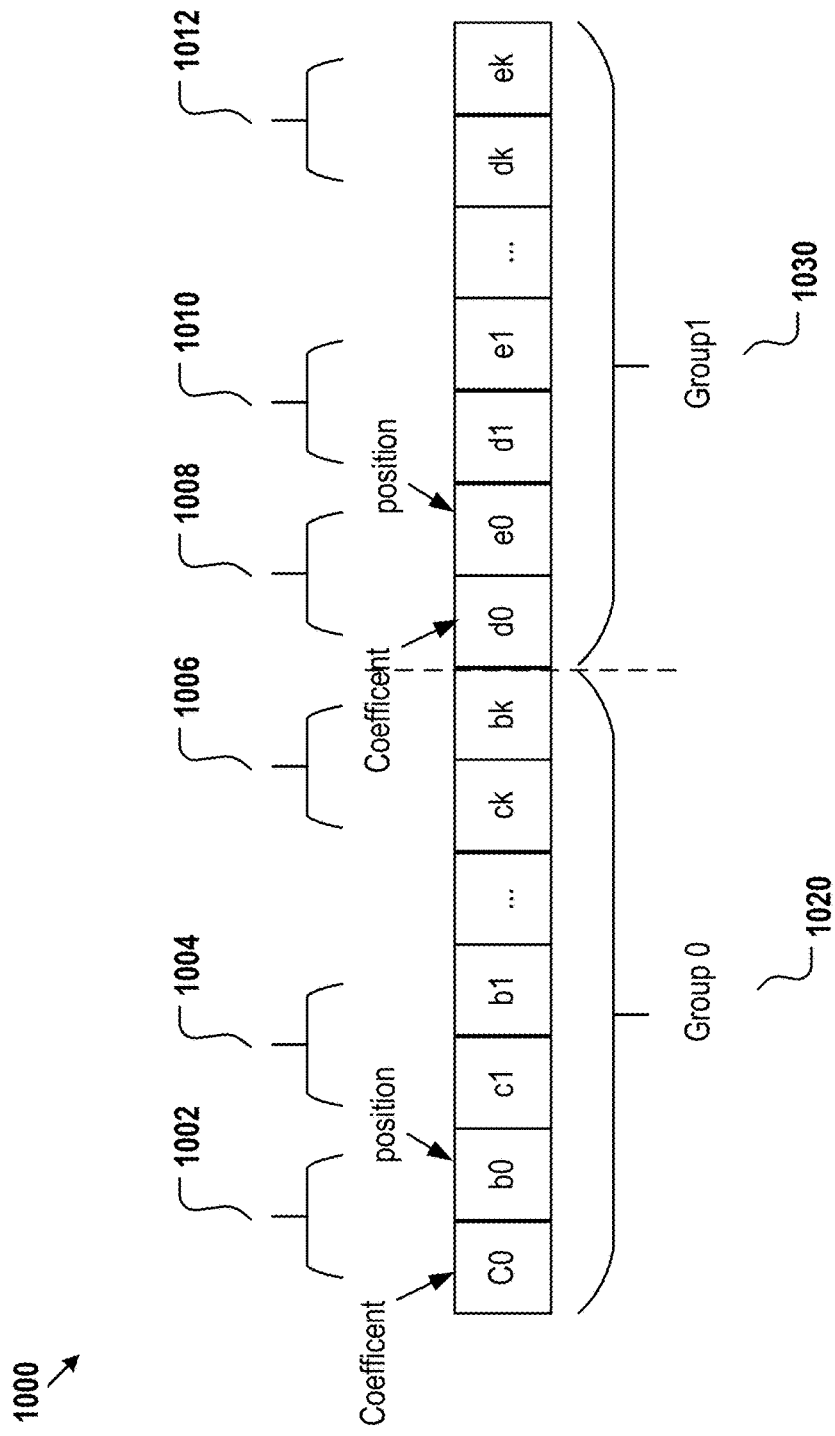
FIG. 10 illustrates bit sequence configuration for feeding back weighting coefficients in channel state information.

The amplitude, phase, and position of the above nonzero coefficients may be mapped to a group of uplink control information (UCI) bit sequence in various exemplary manners. One example is shown in FIG. 10. After the bit sequence corresponding to the amplitude, phase, and position values of each coefficient are concatenated, as shown by 1002-1012 of FIG. 10, they are mapped in the UCI bit sequence in the order of the coefficients. In some implementations, a total $K_{tot}$ coefficients may be divided into A groups, shown as two groups (segments) 1020 and 1030 in FIG. 10, each of which contains amplitude, phase, and position values corresponding to $K_{tot}/A$ coefficients. As further shown by the bit sequence 1000 of FIG. 10, these groups of coefficients and their positions may be mapped in the UCI bit sequence in order of coefficients and in order of grouping. Additionally, according to the resources allocated by the PUSCH and parameters such as beta_offset, the terminal may omit one or more of the A groups and then perform UCI transmission for CSI feedback. The orders for the coefficients or grouping above may be based on a priority ranking.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", "and/or," as used herein may include a variety of meanings that may depend at least in part on the context in which such terms are used. Typically, "or" if used to associate a list, such as A, B or C, is intended to mean A, B and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for reporting wireless channel state information (CSI), comprising:
   receiving, by a wireless terminal device, CSI reference signals (CSI-RS's) transmitted from a wireless access network node;
   generating, by the wireless terminal device based on measuring the CSI-RS's, one or more indicators associated with one or more nonzero elements in a CSI feedback information in a vector space determined by a set of first basis vectors in spatial domain, a set of second basis vectors in frequency domain, a set of third basis vectors in time domain; and
   transmitting, by the wireless terminal device, information pertaining to the one or more nonzero elements in the CSI feedback information and pertaining to the one or more indicators to the wireless access network node,
   wherein the information pertaining to the one or more indicators comprises a positional information of the one or more nonzero elements in the vector space, wherein the positional information comprises an index representing a linearization of a first index, a second index, and a third index into the set of first basis vectors, the set of second basis vectors, and the set of third basis vectors, respectively.

2. The method of claim 1, wherein the set of first basis vectors, the set of second basis vectors, the set of third basis vectors are selected by the wireless terminal device from a first codebook, a second codebook, and a third codebook, respectively.

3. The method of claim 1, wherein at least one set of the set of first basis vectors, the set of second basis vectors, and the set of third basis vectors are selected from a set of candidate basis vectors configured by the wireless network access node.

4. The method of claim 1, wherein:
   the vector space is divided into a plurality of sub-vector spaces; and
   the positional information of one nonzero element in one sub-vector space comprises:

at least one of:
  a first index, a second index, and a third index into the one sub-vector space for the one nonzero element, or
  an index representing a linearization of a first index, a second index, and a third index into the one sub-vector space for the one nonzero element; and
  a fourth index identifying the one sub-vector space among the plurality of sub-vector spaces.

5. The method of claim 1, wherein the information pertaining to a nonzero element in the CSI feedback information and information pertaining to an indicator associated with the nonzero element are mapped to adjacent locations in an uplink control information when being transmitted to the wireless access network node by the wireless terminal device.

6. The method of claim 1, wherein:
the one or more nonzero elements are divided into a plurality of groups based on a priority ranking; and
information pertaining to the one or more nonzero elements and to the one or more indicators are mapped to an uplink control information according to the priority ranking.

7. A wireless communication device comprising one or more processors and one or more memories, wherein the one or more processors are configured to read computer code from the one or more memories to implement the method in claim 1.

8. A method for reporting wireless channel state information (CSI), comprising:
transmitting, by a wireless access network node, CSI reference signals (CSI-RS's) to a wireless terminal device; and
receiving, by a wireless access network node, a CSI report based on measurement of the CSI-RS's by the wireless terminal device,
wherein the CSI report comprises:
  information pertaining to one or more indicators associated with one or more nonzero elements in a CSI feedback information generated by the wireless terminal device in a vector space determined by a set of first basis vectors in spatial domain, a set of second basis vectors in frequency, and a set of third basis vectors in time domain,
wherein the information pertaining to the one or more indicators comprises a positional information of the one or more nonzero elements in the vector space, and
wherein the positional information comprises an index representing a linearization of a first index, a second index, and a third index into the set of first basis vectors, the set of second basis vectors, and the set of third basis vectors, respectively; and
information pertaining the one or more nonzero elements.

9. The method of claim 8, wherein the set of first basis vectors, the set of second basis vectors, the set of third basis vectors are selected by the wireless terminal device from a first codebook, a second codebook, and a third codebook, respectively.

10. The method of claim 8, wherein at least one set of the set of first basis vectors, the set of second basis vectors, and the set of third basis vectors are selected from a set of candidate basis vectors configured by the wireless network access node.

11. The method of claim 8, wherein:
the vector space is divided into a plurality of sub-vector spaces; and
the positional information of one nonzero element in one sub-vector space comprises:
at least one of:
  a first index, a second index, and a third index into the one sub-vector space for the one nonzero element, or
  an index representing a linearization of a first index, a second index, and a third index into the one sub-vector space for the one nonzero element; and
  a fourth index identifying the one sub-vector space among the plurality of sub-vector spaces.

12. The method of claim 8, wherein the information pertaining to a nonzero element in the CSI feedback information and information pertaining to an indicator associated with the nonzero element are received by the wireless access network node in adjacent locations in an uplink control information.

13. The method of claim 8, wherein:
the one or more nonzero elements are divided into a plurality of groups based on a priority ranking; and
information pertaining to the one or more nonzero elements and the information pertaining to the one or more indicators are received by the wireless access network node as mapped in an uplink control information according to the priority ranking.

14. A wireless communication device comprising one or more processors and one or more memories, wherein the one or more processors are configured to read computer code from the one or more memories to implement the method of claim 8.

* * * * *